(12) United States Patent
Hu

(10) Patent No.: US 11,017,515 B2
(45) Date of Patent: May 25, 2021

(54) THERMAL IMAGE WARM-TARGET DETECTION AND OUTLINE FORMATION

(71) Applicant: Goodrich Corporation, Charlotte, NC (US)

(72) Inventor: Haijun Hu, Westford, MA (US)

(73) Assignee: Goodrich Corporation, Charlotte, NC (US)

( * ) Notice: Subject to any disclaimer, the term of this patent is extended or adjusted under 35 U.S.C. 154(b) by 65 days.

(21) Appl. No.: 16/269,516

(22) Filed: Feb. 6, 2019

(65) Prior Publication Data

US 2020/0250804 A1    Aug. 6, 2020

(51) Int. Cl.
*G06T 7/00* (2017.01)
*G06T 7/90* (2017.01)
(Continued)

(52) U.S. Cl.
CPC ............ *G06T 7/0002* (2013.01); *G06T 5/002* (2013.01); *G06T 5/50* (2013.01); *G06T 7/90* (2017.01);
(Continued)

(58) Field of Classification Search
CPC ......... G06T 7/0002; G06T 7/90; G06T 5/002; G06T 5/50; G06T 2207/10048; G06T 2207/20221; G06T 5/001; G06T 7/13
See application file for complete search history.

(56) References Cited

U.S. PATENT DOCUMENTS

| 5,488,256 A | 1/1996 | Tsunoda |
| 7,961,906 B2 | 6/2011 | Ruedin |

(Continued)

FOREIGN PATENT DOCUMENTS

| CN | 107025641 A | 8/2017 |
| CN | 108090888 A | 5/2018 |

(Continued)

OTHER PUBLICATIONS

Anonymous, "Adding New Color Palettes to Origin", clearer copy for IDS Jul. 27, 2020 (Year: 2017).*

(Continued)

*Primary Examiner* — Qian Yang
(74) *Attorney, Agent, or Firm* — Locke Lord LLP; Scott D. Wofsy; Judy R. Naamat

(57) ABSTRACT

An image processing system is provided. The image processing system includes a memory configured to store instructions and a processor disposed in communication with the memory. The processor, upon execution of the instructions is configured to receive an input image output by an imaging sensor, wherein the image sensor is sensitive to thermal emissions. The processor, upon execution of the instructions, is further configured to determine a continuous and monotonic color map for each of at least two color channels of a color scheme system, apply at least one filter to the input image by sliding a moving window through the entire input image and applying the filter to content of the input image at each location of the moving window to generate an outline of a warm target based on the content of the input image, and output a result of the applied at least one filter mapped in accordance with the color maps to a displayable image product.

17 Claims, 8 Drawing Sheets

(51) Int. Cl.
*G06T 5/00* (2006.01)
*G06T 5/50* (2006.01)

(52) U.S. Cl.
CPC ............ *G06T 2207/10048* (2013.01); *G06T 2207/20221* (2013.01)

(56) References Cited

U.S. PATENT DOCUMENTS

| | | |
|---|---|---|
| 8,836,793 B1 | 9/2014 | Kriesel et al. |
| 2012/0008297 A1 | 1/2012 | Aoyama et al. |
| 2013/0028490 A1 | 1/2013 | Kim et al. |
| 2017/0061663 A1 | 3/2017 | Johnson et al. |
| 2018/0330473 A1 | 11/2018 | Foi et al. |
| 2020/0193583 A1 | 6/2020 | Hu |

FOREIGN PATENT DOCUMENTS

| | | |
|---|---|---|
| EP | 3667610 A1 | 6/2020 |
| JP | 2004087786 A | 3/2004 |
| WO | WO-2010141772 | 12/2010 |
| WO | WO-2018014326 A1 | 1/2018 |

OTHER PUBLICATIONS

Partial European Search Report for European Patent Application No. EP19211171.4, dated Jul. 6, 2020.
Anonymous: "Color Maps (Using Color, Light, Jul. 6, 2020.and Transparency) (MATLAB) Part 3", 925 Oct. 2016 (Oct. 25, 2016), XP055705960, Retrieved from the Internet: URL:https://web.archive.org/web/20161025210704/http://what-when-how.com/graphics-and-guis-with-matlab/color-maps-using-colorli ghtand-transparency-matlab-part-3/ [retrieved on Jun. 17, 2020], the whole document.
Anonymous: "Adding New Color Palettes to Origin", Oct. 14, 2017 (Oct. 14, 2017), XP055705968, Retrieved from the Internet: URL:https://web.archive.org/web/20171014071530/http://originlab.com/doc/Origin-Help/ CustomizeOrigin-NewColorPal [retrieved on Jun. 7, 2020], the whole document.
Gonzalo R Arce et al: "Nonlinear Filtering for Image Analysis and Enhancement" In: "Handbook of Image and Video Processing (Second Edition)", Jan. 1, 2005 (Jan. 1, 2005), Elsevier Academic Press, Amsterdam, NL, XP055705971, ISBN: 978-0-12-119792-6, p. 130.
Extended European Search Report for European Patent Application No. EP19213728.9, dated Jun. 5, 2020.
Extended European Search Report for European Patent Application No. EP19211171.4, dated Oct. 5, 2020.

\* cited by examiner

THERMAL IMAGE WARM-TARGET DETECTION AND OUTLINE FORMATION

BACKGROUND OF THE INVENTION

1. Field of the Invention

The present disclosure relates to image processing, and more particularly to warm target detection outline formation.

2. Description of Related Art

Thermal imaging to detect warm targets is used in various applications, such as targeting, surveillance, or general purpose imaging under limited lighting conditions, such as when lighting sources in other spectral regions, such as the visible region, are less effective or unavailable. A warm target can include warm bodies of a living being or other targets that store or generate heat, such as a motor, energy source, etc. Detecting a warm target and depicting it effectively along with other informative image contents on a display device can be challenging, such as when the warm target is of poor quality (e.g., due to poor imaging conditions) or when competing scene contents and/or features interfere with the warm target, which make simultaneous depiction with the warm body target ineffective, difficult, or impossible.

Existing techniques may have been considered satisfactory for their intended purpose, however, there is an ever present need for improved depiction of warm targets in various operating environments, especially more complex operating environments. This disclosure provides a solution for this need.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is an image processing system. The image processing system includes a memory configured to store instructions and a processor disposed in communication with the memory. The processor, upon execution of the instructions is configured to receive an input image output by an imaging sensor, wherein the image sensor is sensitive to thermal emissions. The processor, upon execution of the instructions, is further configured to determine a continuous and monotonic color map for each of at least two color channels of a color scheme system, apply at least one filter to the input image by sliding a moving window through the entire input image and applying the filter to content of the input image at each location of the moving window to generate an outline of a warm target based on the content of the input image, and output a result of the applied at least one filter mapped in accordance with the color maps to a displayable color image product.

In another aspect, a method of processing an image is provided. The method includes receiving an input image output by an imaging sensor, wherein the image sensor is sensitive to thermal emissions. The method further includes determining a color map for each of at least two color channels of a color scheme system, wherein each color map is continuous and monotonic. The method further includes applying at least one filter to the input image by sliding a moving window through the entire input image and applying the filter to content of the input image at each location of the moving window to generate an outline of a warm target based on the content of the input image and outputting a result of the applied at least one filter mapped in accordance with the color maps to a displayable color image product.

In embodiments, the processor, upon execution of the instructions can be further configured to convert each pixel of the image to eight bits for color representation and processing.

In embodiments, the processor, upon execution of the instructions can be further configured to apply a smoothing operation to the input image.

In embodiments, determining each of the color maps can include constructing a continuous and monotonic mapping function for the corresponding color channel, wherein each mapping function can have at least one independent control.

In embodiments, the at least one independent control can include multiple independent controls.

In embodiments, the mapping function can be a sigmoid function that can have independent control of its steepness, center, and scale.

In embodiments, the sigmoid functions of each of the respective color channels can be staggered relative to one another.

In embodiments, two of the sigmoid functions can be identical to each other.

In embodiments, the processor, upon execution of the instructions can be further configured to normalize the input image before further processing of the input image.

In embodiments, the outline can be formed of gray-level pixels having more than two levels.

In embodiments, the processor, upon execution of the instructions can be further configured to apply a threshold function to the outline, the threshold function outputting a bounded outline.

In embodiments, the processor, upon execution of the instructions can be further configured to refine the bounded outline by applying at least one of a morphological thinning function and a morphological closing function.

In embodiments, the processor, upon execution of the instructions can be further configured to display a displayable image that is a selectable combination of the input image and other displayable image content, wherein the input image and the other displayable image content can be registered with one another.

In embodiments, the processor, upon execution of the instructions can be further configured to determine a quality metric for the input image as a function of quality of image content of the input image by sliding a second moving window through a plurality of locations of the input image, wherein the second moving window is sized to include at least a significant portion of a target of interest. The processor, upon execution of the instructions can be further configured to apply an enhancement process to the input image and generate a resulting enhanced image that is spatially registered with the input image, determine a quality metric for the enhanced image as a function of quality of image content of the enhanced image by sliding the second moving window through the plurality of locations of the entire enhanced image, determine single-channel fused content of the input image at each location of the plurality of locations as a function of the content of the input image, the quality metric for the input image, the content of the enhanced image, and the quality metric for the enhanced image determined for the location, and generate a single-channel fused image for the input image that includes the single-channel fused content of the input image determined for each location of the plurality of locations.

In embodiments, determining the quality metric for the input image can include determining an effective signal-to-noise ratio for a region of the input image covered by the second moving window at each location of the plurality of locations, and determining the quality metric for the enhanced image can include determining an effective signal-to-noise ratio for the region of the enhanced image covered by the second moving window at each location of the plurality of locations. The processor, upon execution of the instructions can be further configured to determine an enhancement gain for each location of the plurality of locations as a function of a ratio of the quality metric for the input image relative to the quality metric for the enhanced image determined for the location, wherein determining the single-channel fused content of the input image at each location of the plurality of locations is a function of the enhancement gain determined for the location.

In embodiments, the processor, upon execution of the instructions can be further configured to display an image product that is a selectable combination of the input image, the enhanced image, and the single-channel fused image.

In embodiments, the processor, upon execution of the instructions, can be further configured to receive a second input image output by a second imaging sensor, wherein the second input image can be synchronized and spatially registered with the input image provided by the first imaging sensor, and the first imaging sensor and the second imaging sensor may have disparate imaging sensitivities and/or responsivities for capturing images relative to one another or output images having different qualities relative to one another.

The processor, upon execution of the instructions can be further configured to determine a quality metric for the second input image as a function of quality of image content of the second input image by sliding the second moving window through the plurality of locations of the second input image, apply the enhancement process to the second input image and generate a resulting second enhanced image that is spatially registered with the second input image, determine a quality metric for the second enhanced image as a function of quality of image content of the second enhanced image by sliding the second moving window through the plurality of locations of the second enhanced image, determine single-channel fused content of the second input image at each location of the plurality of locations as a function of the content of the second input image the quality metric for the second input image, the content of the second enhanced image, and the quality metric for the second enhanced image determined for the location, and generate a single-channel fused image for the second input image that includes the single-channel fused content of the second input image determined for each location of the plurality of locations.

In embodiments, the imaging sensor can be configured to sense images using a first spectral wavelength range and the second imaging sensor can be configured to sense images using a second spectral wavelength range that is different than the first spectral wavelength range, wherein at least one of the first and second spectral wavelength ranges can be in the thermal infrared range.

In embodiments, the processor, upon execution of the instructions, can be further configured to determine a quality metric for the single-channel fused image for the input image as a function of quality of image content of the single-channel fused image for the input image by sliding a second moving window through the plurality of locations of the single-channel fused image for the input image, determine a quality metric for the single-channel fused image for the second input image as a function of quality of image content of the single-channel fused image for the second input image by sliding a second moving window through the plurality of locations of the single-channel fused image for the second input image, determine multi-channel fused content at each location of the plurality of locations as a function of the content of the input image, the content of the second input image, the quality metric for the input image, the quality metric for the second input image, the content of the enhanced image, the content of the second enhanced image, the quality metric for the enhanced image, and the quality metric for the second enhanced image determined for the location, and generate a multi-channel fused image that includes the multi-channel fused content determined for each location of the plurality of locations.

In embodiments, the processor, upon execution of the instructions can be further configured to display a displayable image product that can be a selectable combination of the input image, the second input image, the enhanced image, the second enhanced image, the single-channel fused image of the input image, the single-channel fused image of the second input image, and the multi-channel fused image.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1A:
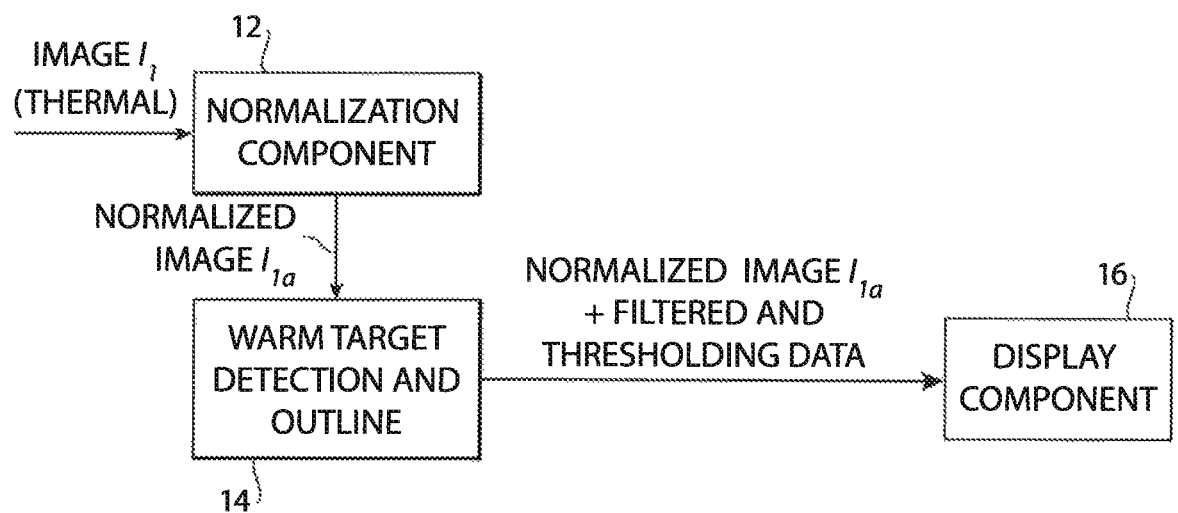
FIG. 1A is a block diagram of an exemplary embodiment of an image processing system that performs a warm target detection and outlining function in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of an image processing system with warm-target detection and outline formation in accordance with the disclosure is shown in FIG. 1A and is designated generally by reference character 10. Methods associated with operations of the image processing system 10 in accordance with the disclosure, or aspects thereof, are provided in FIGS. 2-7 as will be described. The systems and methods described herein can be used for live, real time or offline warm target detection and outline formation, that can be used with image data of a single thermal image or image data of fused images, e.g., thermal image along with other single-spectra or multi-spectral image data, including still and/or streaming image data.

With reference to FIG. 1A the image processing system 10 includes a normalization component 12 that receives a thermal image, image $I_1$, from an image sensor that is sensitive to thermal emissions, such as a long wave infrared (LWIR), or a mid-wave infrared (MWIR), sensor. The term "thermal image" can refer to a fused image that was fused based on at least one image captured by an image sensor that is sensitive to thermal emissions. The fused image can be formed, for example, from a combination of an unenhanced image and an enhanced image and/or from a combination of images from different image sensors as described in patent application Ser. No. 16/218,027, by Haijun Hu, filed on Dec. 12, 2018. The normalization component 12 applies a normalization function (as described later) to the image $I_1$ and outputs a normalized image $I_{1a}$. A warm target detection and outline (WTDO) component 14 applies warm target detection and outline formation functions to the normalized thermal image $I_{1a}$. The input image $I_1$ (which can be fused or enhanced) and the normalized image $I_{1a}$ are black-and-white (i.e., non-color) or gray-level images.

The WTDO component 14 outputs a thermal image of a warm target with an outline of the warm target (referred to as a thermal outline) to a display component 16. The thermal image of the warm target and thermal outline can be output to the display component 16 as an image product for black-and-white display separately or fused together or for display with a color map set, such that the thermal image of the warm target, the thermal outline, or a fused image that includes the thermal image of the warm target and thermal outline can be displayed in color. The term "displayable image product" refers to data that can be displayed as an image by a display device, wherein the displayable image product includes data that is the result of processing the input image $I_1$. The thermal image of the warm target and the thermal outline is generated by a series of filtering and thresholding operations, applied to the normalized thermal image $I_{1a}$.

The thermal image of the warm target and the thermal outline can be used together, and or together with other images, to compose various color images, also referred to as color composites that can be displayed by the display component 16. As is known by those skilled in the art, a color scheme system of independent colors (e.g., red, green, and blue (RGB)) can be used to compose other colors, by varying proportions of each color component, or by varying color maps, or both. When applying a color map that has been loaded into memory to manipulate color for display of the thermal input image and its thermal outline with other images, a color selected for use with the outline can become diluted, overshadowed, or otherwise negatively affected by colors used by other images or by the content of the other images. Accordingly, the WTDO component 14 performs a method configured to use content of the input image $I_1$ and a set of consistent color maps that follow non-arbitrary rules (e.g., conventional or established rules, such as brighter colors being mapped for warmer targets) in order to determine and retain proper color depiction of the thermal outline, without being negatively affected by colors used by or content of other images.

The displayed warm target and its thermal outline, including when displayed using the set of color maps and in combination with other images, can be used, for example and without limitation, for military offensive or defensive operations (e.g., military target tracking and aiming for shooting), border-security monitoring, and/or general-purpose military or civilian surveillance operations. The image processing system 10 can be configured to operate as a stand-alone system or in combination with other systems (e.g., tracking and aiming systems). The image processing system 10 can be used on various platforms, including ground-based, shipborne, airborne, or spaceborne mobile or vehicle platforms.

Figure 1B:
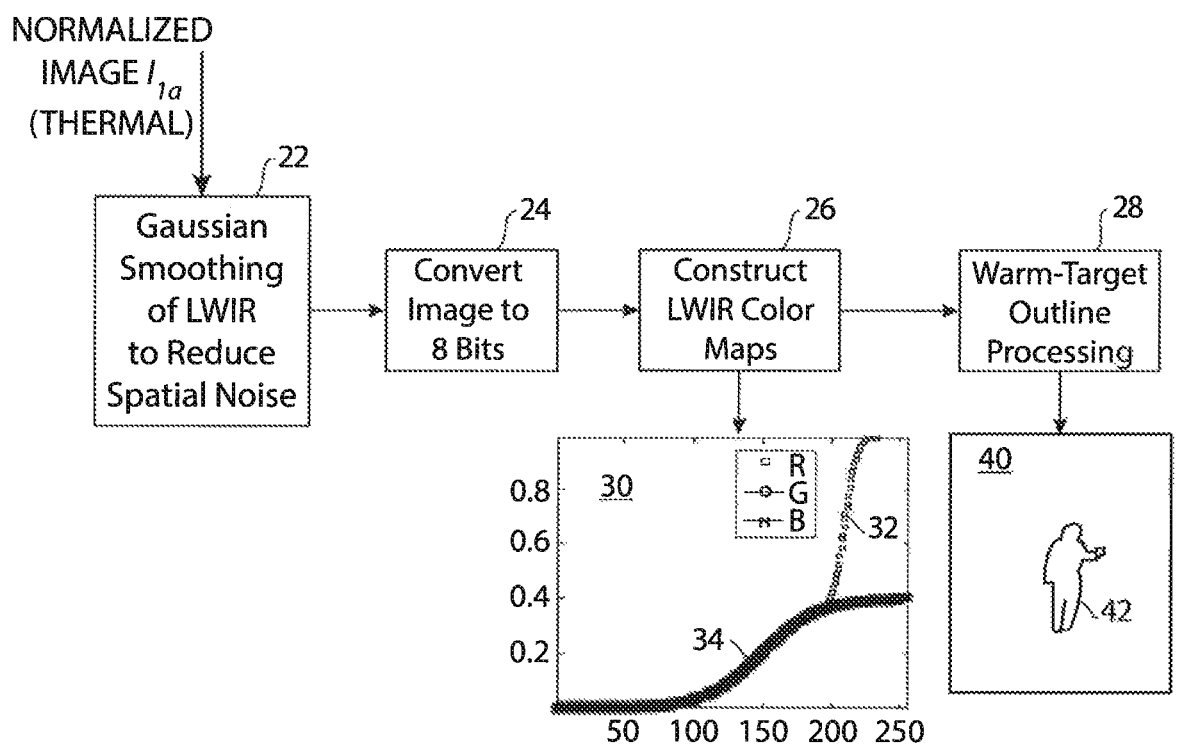
FIG. 1B is a flow diagram of an exemplary method performed by a warm target outline component of the image processing system in accordance with embodiments of the disclosure.
Figure 5:
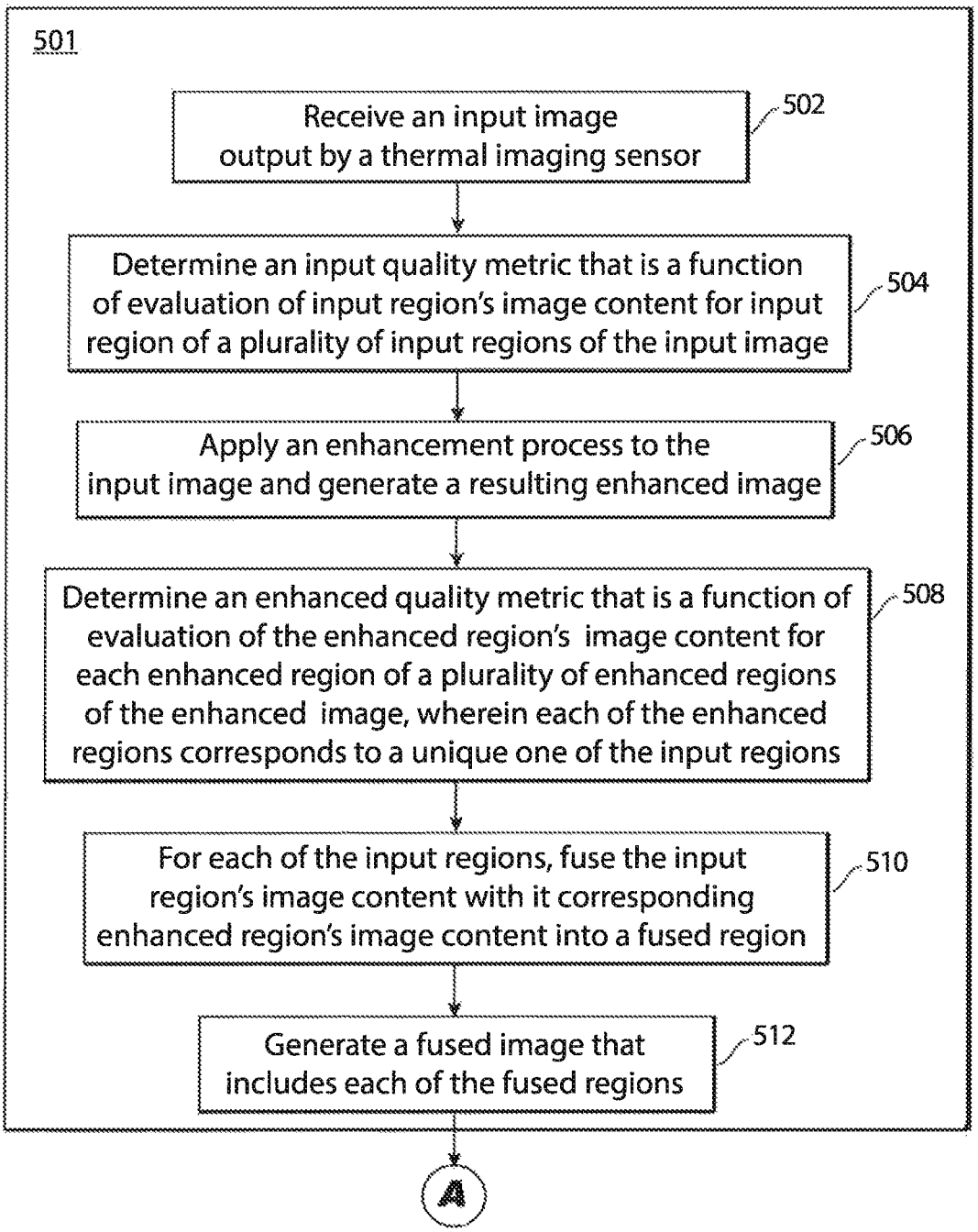
FIG. 5 is a flow diagram of an example method of processing an input image in accordance with embodiments of the disclosure.
Figure 6:
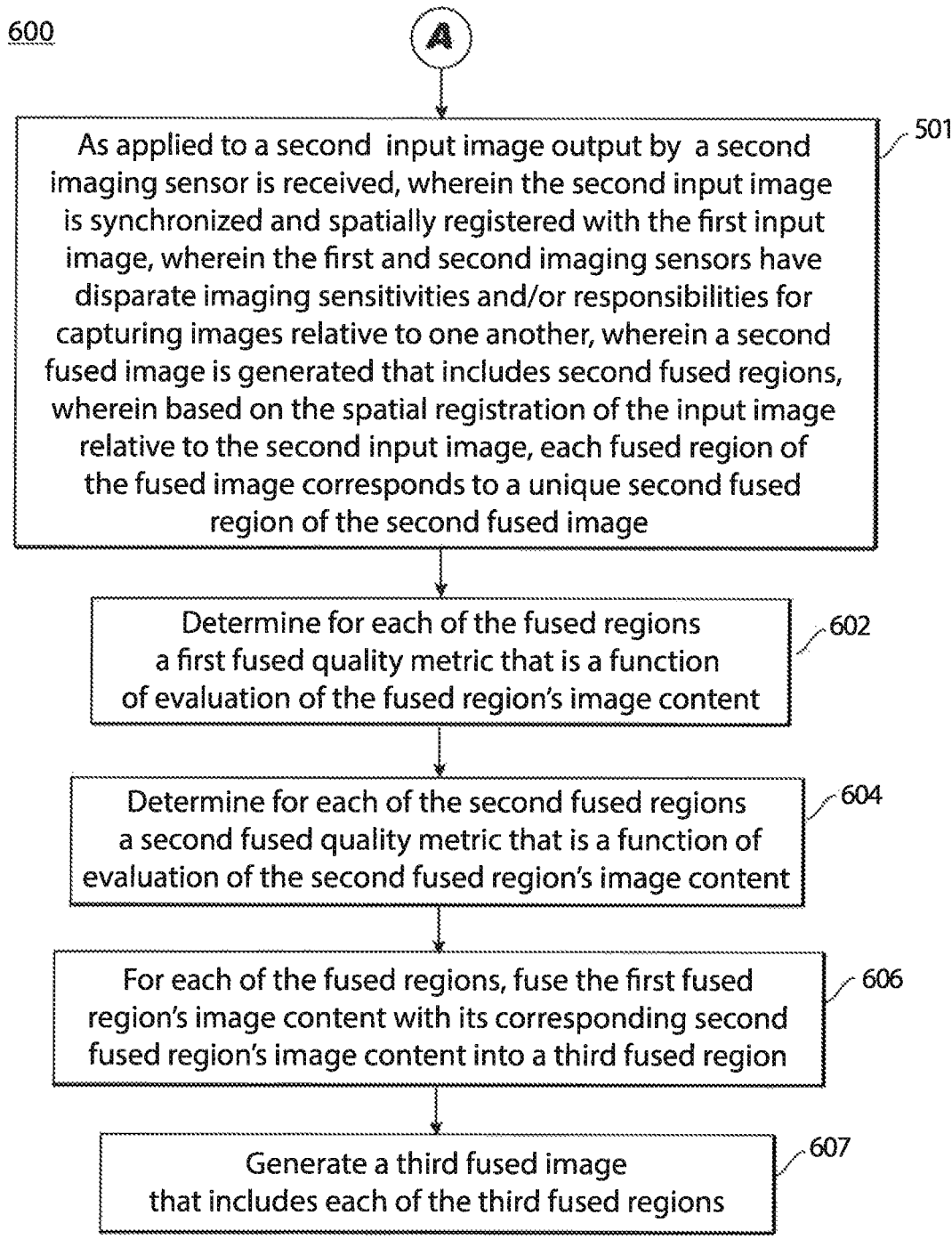
FIG. 6 is a flow diagram of an example method of processing a second input image for fusion with the first input image in accordance with embodiments of the disclosure.

With reference now to FIG. 1B, and FIGS. 5 and 6 below, shown are flow diagrams demonstrating implementation of the various exemplary embodiments. It is noted that the order of operations shown in FIGS. 1B, 5, and 6 is not required, so in principle, the various operations may be performed out of the illustrated order or in parallel. Also certain operations may be skipped, different operations may be added or substituted, or selected operations or groups of operations may be performed in a separate application following the embodiments described herein.

FIG. 1B shows a flow diagram 20 of an example method performed by the WTDO component 14. At operation 22, the WTDO component 14 applies a smoothing algorithm to the received image, which in the example is normalized thermal image $I_{1a}$. The smoothing algorithm can include, for example, a Gaussian smoothing function. The Gaussian smoothing function can use a kernel sized for minimal smoothing operations, for example a 3×3 Gaussian kernel. At operation 24, the WTDO component 24 converts each pixel of the smoothed image to eight bits. A conversion to eight bits is required for color processing and color mapping operations. For example, standard RGB color mapping requires all color intensity to be represented by eight-bit integers. At operation 26, the WTDO component 14 constructs a color map (or a set of color maps) of the converted image. At operation 28, the WTDO component 14 applies warm-target processing.

Operation 26 is now described in greater detail. At operation 26, a set of three color maps, e.g., representing the RGB channel colors, is constructed and independently controlled. Construction of the set of color maps may include application of a set of monotonic mapping functions, such as an analytical sigmoid function (non-linear, but spatially continuous and smooth), or a set of piece-wise linear functions (piecewise linear and spatially continuous) to the WTDO output. The color maps are thus monotonic and continuous, the term "continuous," as used herein, referring to no gaps in the mapping operations, In the example shown, WTDO component 14 uses monotonic color mapping and staggers the maps having brighter colors with larger values to achieve proper color depiction of the thermal outline.

The set of color maps includes at least one color channel that is specifically configured to effectively depict the warm targets, for example using a strong warm color (such as yellow or red) for the highest warm target intensity. The set of color maps can be used together on the thermal emission image $I_{1a}$, to highlight the detected warm target along with the scene (also referred to as the background). One embodiment of the color maps includes three staggered sigmoid functions, each having at least one independent control. In embodiments, each sigmoid function has multiple independent controls, such as steepness, center, and/or scale, which give a user a large degree of flexibility. In embodiments the color maps are constructed by applying other monotonic mathematical representations (such as piece-wise linear). In embodiments, two of the color maps are constructed to have identical controllable parameters.

Three color maps of a color map set are demonstrated in exemplary Equations (A)-(C) that use an RGB color scheme system:

$$CM(B) = B_{scl} * \{1.0 + \tanh[B_{stp} * 1.0 - B_{ctr}]\} \quad (A)$$

$$CM(G) = CM(B) + G_{scl} * \{1.0 + \tanh[G_{stp} * 1.0 - G_{ctr}]\} \quad (B)$$

$$CM(R) = CM(G) + R_{scl} * \{1.0 + \tanh[R_{stp} * 1.0 - R_{ctr}]\}, \quad (C)$$

where R, G, B represent red, green, and blue, respectively, with subscripts "scl", "stp", and "ctr" representing scale, steepness, and center, respectively, and tanh is the hyperbolic tangent function. In embodiments, one of the color maps includes two color channels of identical color maps, e.g., CM(G)=CM(B). FIG. 1B shows an output set of color maps 30 including a first color map 32 for channel CM(R), and a second color map 34 for both channels CM(B) and CM(G).

Regardless of the mathematical forms used, the warmest target is mapped to the highest pixel values processed (or vice versa) in order to facilitate warm target recognition. In the event that two of the color channels are made to be identical to each other, these two channels are selected so that they are not the color channel to which the warm target outline is mapped. This serves the purpose of highlighting the warm targets while deemphasizing other contents.

Operation 28 is now described in greater detail. At operation 28, one or more filters are applied that are configured to generate warm target detection and outline to the normalized input image $I_{1a}$, which includes an M×N array of pixels. The M×N array can be the size of the input image, or a subsection of it. A first example filter is a peak-to-peak filter applied over a moving window of size n×n (n is an odd number), centered at $(i_c, j_c)$, wherein the center $(i_c, j_c)$ is moved pixel-by-pixel through the array of M×N array of pixels. The peak-to-peak filter is configured as represented in Equations (D)-(E):

$$I(i_c, j_c) = \max[I(i, j)] - \min[I(i, j)], \text{ where} \quad (D)$$

$$1 \le i_c \le M, 1 \le j_c \le N, \text{ and}$$

$$|i - i_c| \le \frac{n-1}{2}, |j - j_c| \le \frac{n-1}{2}$$

Alternatively, a max, min, or median filter can be similarly formulated as:

$$I(i_c, j_c) = \text{operator } [I(i, j)], \text{ where} \quad (E)$$

$$1 \le i_c \le M, 1 \le j_c \le N, \text{ and}$$

$$|i - i_c| \le \frac{n-1}{2}, |j - j_c| \le \frac{n-1}{2}$$

with the operator being selected from one of max, min, or median functions.

At operation 28, either the peak-to-peak filter or one of the max, min, or median filters are applied to the area of the array of M×N pixels covered by the window (the window including an n×n matrix of unsigned 8-bit integers) at each location of the window as the window is moved through the image. In this way, the filter is applied by operating on image content of the M×N array at each location of the window. This forms an initial outline, which is a coarse estimate of the thermal outline. The initial outline is stored for subsequent refinement processing. The filters defined by Equations (D)-(E) are of high sensitivity to spatial gradients of an image, facilitating detection of potential thermal outlines.

A threshold function is applied next to the initial outline to generate a bounded outline. Values used for the threshold function can be experimentally determined. In embodiments, values equal to 3-5 times the mean of the input outline can be effectively practical and robust.

The initial and bounded outlines are formed of gray-level pixels rather than binary ones, which can retain significantly more outline details. This makes possible further refinement of the initial and bounded outlines, as described below. In embodiments, outline refinement procedures include at least one of the following filter operations: 1) morphological thinning, which is used to reduce the thickness of the bounded outline; 2) morphological closing, which is used to close the gaps generated by each of the previous steps.

The output of operation 28 includes an outline 42 that can be displayed separately as a stand-alone image layer 40, or combined with other layers of the normalized image $I_{1a}$ and displayed together as a fused image. Other layers of image may include the input image $I_1$ itself (i.e., before processing), or images from other channels, with or without processing (although some normalization is often needed). When combined with such other images, the initial and bounded outlines are not negatively affected by colors used by or content of the other images. The image processing system 10 receives images from at least one thermal sensor 102, includes a synchronization and registration (S/R) and normalization component 104, single-channel image fusion component 106, and multi-channel fusion component 108, and outputs a channel-fused image $I_f$ to a display component 110.

In a single-channel embodiment, the S/R and normalization component 104 receives images from only one of the thermal sensor 102. Output of the single-channel image fusion component 106 is provided to the display component 110 and is not processed by then multi-channel fusion component 108. The second image sensor 102 and the multi-channel fusion component 108 are shown in dotted lines, as these elements can be omitted in the single-channel embodiment.

In a multi-channel embodiment, the S/R and normalization component 104 receives images from both the first (thermal by default) and second (any other) image sensors 102. Output of the single-channel image fusion component 106 is provided to the multi-channel fusion component 108. Output from the and/or the multi-channel fusion component 108 can be provided to the display component 110, and a selection menu 112 can be provided to select which output to display.

Each of the first and second image sensors 102 includes a sensor that is sensitive to a particular wavelength range (channel) and outputs image data for that channel, wherein one of image sensors 102 is required to be sensitive to thermal emission while the other image sensor 102 may be sensitive to a different wavelength range. In this way, the image processing system 10 receives multi-channel image data. The image data can include still images or streaming images. In embodiments, at least one of the first and second image sensors 102 is sensitive to thermal emission (the first by default). In the example shown, the first wavelength range corresponds to longwave infrared (LWIR) wavelengths, e.g., 8 μm-14 μm and the second wavelength range corresponds to short wave infrared (SWIR) wavelengths, e.g., 0.9 μm-1.7 μm. In embodiments, the first and second image sensors can work in the same or different spectral wavelength range. In an embodiment in which the first and second image sensors 102 work in the same spectral wavelength, the first image sensor 102 can output images having a different quality than images output by the second image sensor 102.

Those skilled in the art will readily appreciate that additional image sensors can be included, and that any suitable wavelengths (including visible) can be used without departing from the scope of this disclosure.

Figure 2:
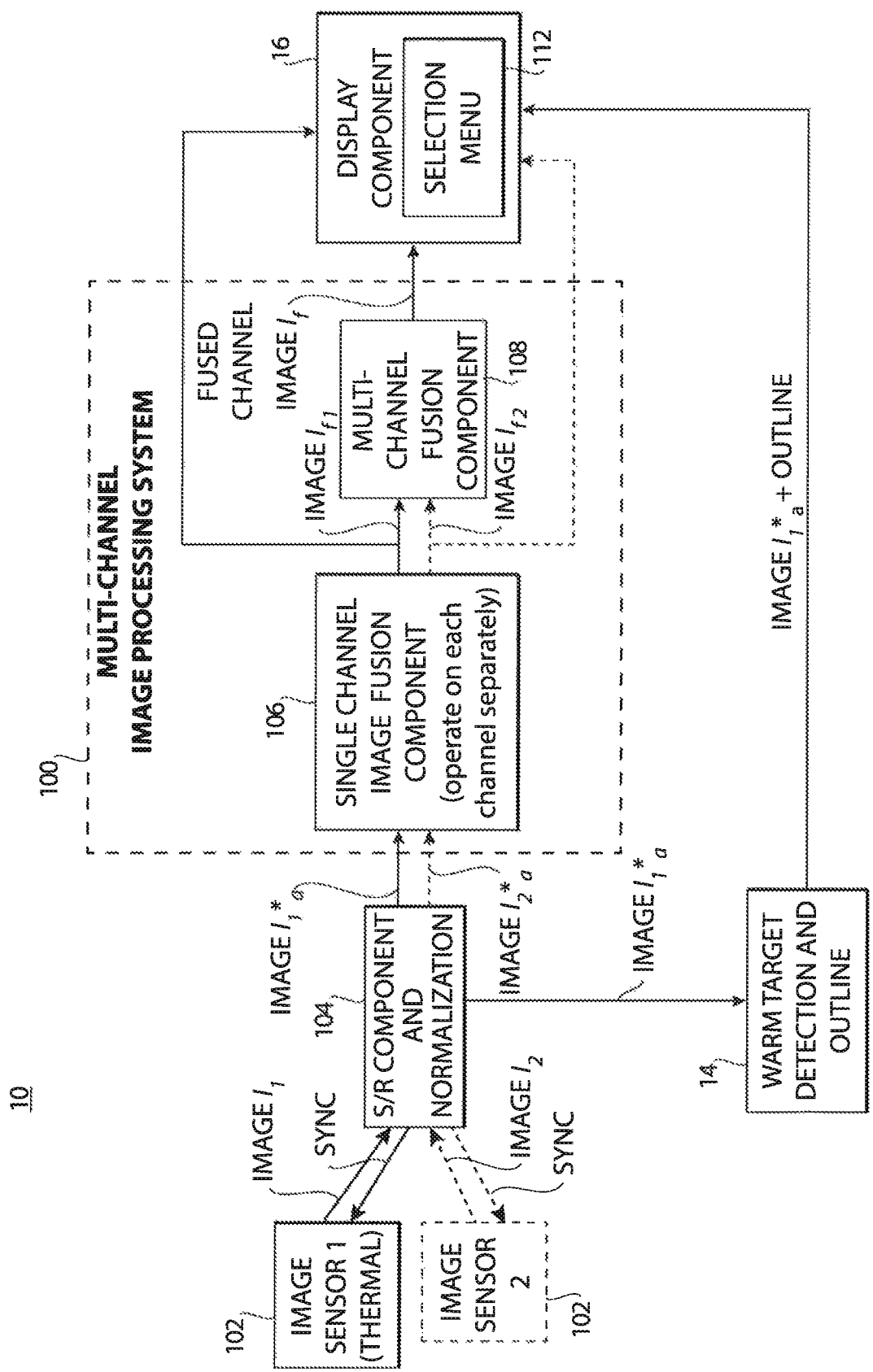
FIG. 2 is a block diagram of an exemplary embodiment of a multi-channel (MC) image processing system that performs multi-channel fusion having a warm target detection and outlining component in accordance with embodiments of the disclosure.

The output of each of the respective image sensors 102 corresponds to a different channel. FIG. 2 shows first image sensor 102 outputting sensed image $I_1$ in a first channel and second image sensor 102 outputting sensed image $I_2$ in a second channel. Image $I_1$ and image $I_2$ were taken simultaneously based on SYNCH control messages provided by S/R and normalization component 104.

S/R and normalization component 104 can be included with or external to the image processing system 10. Portions or all of S/R and normalization component 104 can be included in an imaging system that includes one or more of first and second image sensors 102. The S/R and normalization component 104 can include separate or integrated components for sending a synchronization signal to synchronize capture of image data by the first and second image sensors 102 and spatially registering image data output from the first and second image sensors 102. In operation, the S/R and normalization component 104 sends synchronization control signals SYNCH to synchronize capture of a first image, image $I_1$, from the first image sensor 102 (thermal by default) and a second image, image $I_2$, from the second image sensor 102 (which can use any other frequency bands or have a different sensitivity). The S/R and normalization component 104 further registers image $I_1$ and image $I_2$ relative to one another and outputs image data from the first and second image sensors 102. The S/R and normalization component 104 outputs image $I_1{^*}_a$ and image $I_2{^*}_a$ that are registered relative to one another and were captured in a synchronized fashion. Image $I_1{^*}_a$ corresponds to the first channel and image $I_2{^*}_a$ corresponds to the second channel.

Each of image $I_1{^*}_a$ and image $I_2{^*}_a$ are processed separately by single-channel image fusion component 106, which is shown and described in greater detail in FIG. 2 and in the corresponding description. Single-channel image fusion component 106 processes image $I_1{^*}_a$ and outputs fused image $I_{f1}$ that corresponds to the first channel. Single-channel image fusion component 106 also processes image $I_2{^*}_a$ and outputs fused image $I_{f2}$ that corresponds to the second channel. Multi-channel fusion component 108 processes image $I_{f1}$ and image $I_{f2}$ and outputs a fused channel image $I_f$. The fused channel image $I_f$ is provided to the display component 16, which can be included with or external from the image processing system 10. The display component 16 can display image $I_{f1}$, image $I_{f2}$ or fused channel image $I_f$ overlaid with the one or more thermal outlines. The decision regarding which image to display can be based on a selection from a selection menu 112 provided by the display component 16.

Figure 3:
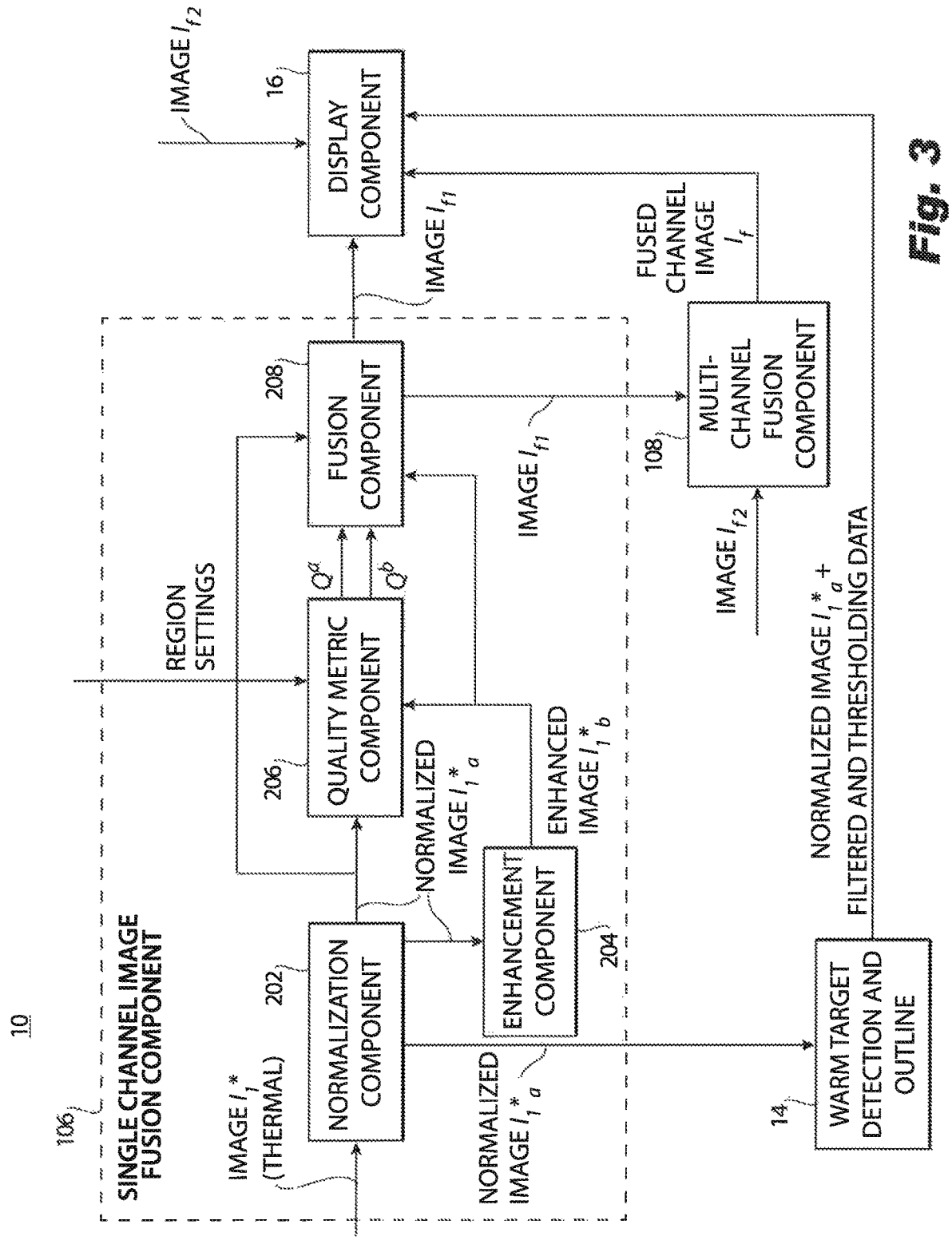
FIG. 3 is a block diagram of an exemplary embodiment of a single-channel image fusion component of the MC image processing system together with the warm target detection and outlining component of FIG. 2.

With reference to FIG. 3, the single-channel image fusion component 106 is shown in greater detail. The single-channel image fusion component 106 can include a normalization component 12, an enhancement component 204, a quality metric component 206, and a fusion component 208.

The single-channel image fusion component 106 processes image $I_1{^*}$ of the first channel and further processes image $I_2{^*}$ of the second channel, wherein images $I_1{^*}$ and $I_2{^*}$ are processed separately. For example, images $I_1{^*}$ and $I_2{^*}$ can be processed at the same time, e.g., in parallel, staggered, or sequentially. The example shown in FIG. 2 shows the single-channel image fusion component 106 receiving and processing image $I_1{^*}$ and outputting image $I_{f1}$ to the display 110 and/or the channel fusion component 108. In the example shown, image $I_{f2}$ is also provided to the channel fusion component 108. Image $I_2{^*}$ was also processed by the single-channel image fusion component 106, either simultaneously, staggered, or sequential relative to the processing of image $I_1{^*}$, with the result of the processing being provided as image $I_{f2}$ to display 16 and/or channel fusion component 108.

The normalization component 12 receives an image from one of the channels, which in the example shown in FIG. 3 is image $I_1{^*}$ of the first channel. Image $I_1{^*}$ is an M×N M×N array of pixels, with pixel value denoted as $I_a(i,j)$ at row and column locations of (i,j), and the subscript "a" indicating that the image is not enhanced). A linear normalization of the image is performed, such as in accordance with example Equation (1):

$$I_N(i, j) = \frac{I_a(i, j) - \min(I_a)}{\max(I_a) - \min(I_a)} \times (I_{max} - I_{min}) + I_{min}, \quad (1)$$

wherein $I_N(i,j)$ is the normalized image, $\max(I_a)$ and $\min(I_a)$ are functions to compute frame-wide (also referred to as global) maximum and minimum values of the input image $I_1{^*}$; $I_{max}$ and $I_{min}$ are desired maximum and minimum output values, which can be based, for example, on an intended bit depth for unsigned integer representation (e.g., $I_{max}$ is often set at 255 for 8-bit integers, and 65,535 for 16-bit integers, whereas $I_{min}$ can be set to any integer value less than Imax $I_{max}$). The normalized image is provided as normalized image $I_1{^*}_a$ to the enhancement component 204 and the quality metric component 206, wherein the term "a" stands for normalized and pre-enhanced (meaning an enhancement process was not yet applied).

The enhancement component 204 receives the normalized image $I_1{*}_a$, applies an enhancement process to the received image, and outputs enhanced image $I_1{*}_b$, wherein the term "b" stands for enhanced and normalized by enhancement process. Images $I_1{*}_a$ and $I_1{*}_b$, are spatially registered, so that each location in image $I_1{*}_a$ has a corresponding location in $I_1{*}_b$, wherein the corresponding locations have the same pixel coordinates. The enhancement process can be configured to enhance contrast. The enhancement process is performed to enhance contrast on a local scale (which is smaller than the regional and global scales, as described below). The local scale is sized as the smallest scale possible, for example 3-7 pixels across any direction, to capture and retain details of features of a target of interest or details of features of a background element of the image being processed by the enhancement process, which increases the probability of detecting and displaying potential targets of interest. In order to apply the enhancement process effectively across the entire image on a frame-wide basis, statistics determined on the global scale (also referred to as frame-wide scale) can be applied to scale the output.

Additionally, to further improve enhancement performance, enhancement can include statistics from an intermediate scale (also referred to as regional scale), that is, a scale between the local and global scales. An example enhancement process is local area contrast enhancement (LACE), which is intended to retain features of the finest spatial resolution while enhancing contrast. LACE can capture small features in an image while scaling with overall (global-scale) scene brightness of the image. The global scale is based on frame-wide statistics that improves conditioning and scaling of the output of an enhanced image output by the enhanced processing. LACE is explained, for example, in U.S. Patent Publication No. 2013/0038626A1 to Feda.

The quality metric component 206 receives the normalized images $I_1{*}_a$ and $I_1{*}_b$ and outputs an image quality metric as defined below.

The quality metric component 206 determines an image quality metric $Q^a$ for image $I_1{*}_a$ and quality metric $Q^b$ for image $I_1{*}_b$ for corresponding locations at the center of a moving window, and calculates an enhancement gain for the given channel as a function of image quality metrics $Q^a$ and $Q^b$. The image quality metric is defined as the effective signal-to-noise ratio of an image determined on the regional scale. The moving window is sized at a regional scale size and has a reference point, such as its center. Most targets of interest would be captured by the regional-scale moving window, which can be set, for example at 11-129 pixels across in any direction. The regional scale is important to target-background differentiation and for target detection. The moving window is designed to traverse all pixels covered by the input image.

The quality metric component 206 determines the regional-scale image quality metric for each location of the reference point of the moving window for each of images $I_1{*}_a$ and $I_1{*}_b$. The moving window is moved so that its reference point advances to each pixel location of the image, covering the entire scene. For each of the images $I_1{*}_a$ and $I_1{*}_b$, for each of the locations of the reference point of the moving window, the image quality metric is computed using the image content in a region covered by the moving window. The moving window is slid pixel by pixel so that an image quality metric matrix the same size as the input image is generated. In embodiments, the movement of the window can be configurable, and the disclosure is not limited to sliding the moving one pixel at a time or requiring that every pixel be weighted equally.

Characteristics of the moving window are defined by region settings provided to the quality metric component 206. These region settings can be input via a user interface of the image processing system 10 or received by another processing device. The region settings can define a window function applied to the moving window. In embodiments, based on the window function applied, the moving window can use, for example, a function of equal weights or some other functions such as a Gaussian function.

For image $I_1{*}_a$ of size M×N, the region covered by the moving window includes m×n pixels centered at location $(i_c, j_c)$. In the examples that follow, the reference point of the window is treated as this center location. In embodiments, the disclosure is not limited to the reference point of the moving window being at its center. The parameters m and n that define the size of the moving window and center index c that defines the center of the moving window can be included in the region settings. The regional scale is defined by the size of the moving window. In embodiments, m and n can be the same value, or of different values.

An example image quality metric determined for each location of its reference point of the moving window can be determined using the effective signal-to-noise ratio (S/N) computed over the moving window. The effective S/N for the center pixel c of the moving window is determined by computing the mean and standard deviation for the region covered by the moving window. The regional statistics for the image include the effective S/N determined for each location of the center of the moving window as the moving window is slid, e.g., by moving its center c from pixel to pixel. The effective S/N for the location of the center is determined in accordance with Equations (2) and (3). The moving window is slid so that its center $i_c$, $j_c$ is moved from pixel to pixel of each of the pixels of image $I_1{*}_a$. The effective S/N is determined using Equations (2) and (3) for each location of the center of the moving window in image $I_1{*}_a$. The same procedure is applied to image $I_1{*}_b$ using Equations (2) and (3):

$$\overline{S_{i_c, j_c}} = \frac{\sum_{\substack{-\frac{m}{2} \leq i - i_c < m/2 \\ -\frac{n}{2} \leq j - j_c < n/2}} I_a(i, j)}{m * n}, \quad (2)$$

$$1 \leq i, i_c \leq M, 1 \leq j, j_c \leq N$$

$$\overline{N_{i_c, j_c}} = \frac{\sum_{\substack{-\frac{m}{2} \leq i - i_c < m/2 \\ -\frac{n}{2} \leq j - j_c < n/2}} [I_a(i, j) - \overline{S_{i_c, j_c}}]^2}{m * n - 1}, \quad (3)$$

$$1 \leq i, i_c \leq M, 1 \leq j, j_c \leq N$$

wherein $I_a(i,j)$ represents the original, or normalized, input pixel value at location $(i,j)$. The overbars notation indicates spatial averaging. Centered estimates of these quantities are obtained with m and n being odd numbers.

The quality metric component 206 determines for each of images $I_1{*}_a$ and $I_1{*}_b$ at each location of the center of the moving window, an image quality metric Q (which represents $Q^a$ for the pre-enhancement image $I_1{*}_a$ and $Q^b$ for the enhanced image $I_1{*}_b$) using content of the region covered by the moving window. The image quality metric can be determined using the effective signal to noise ratio in accordance with Equation (4). The image quality metric is determined using Equation (4) for each location in image $I_1{*}_a$ of the center of the moving window. The same procedure is applied to image $I_1*_b$ using Equations (4):

$$Q_{i_c,j_c} = \frac{\overline{S_{i_c,j_c}}}{\overline{N_{i_c,j_c}}}, \qquad (4)$$

$$1 \le i_c \le M, 1 \le j_c \le N$$

For each location in the image $I_1*_a$ (before enhancement) and its corresponding location in image $I_1*_b$, the fusion component 208 determines an enhancement gain, which is gain due to the enhancement processing. The enhancement gain is defined in accordance with Equation (5): For each iteration of Equation (5), the location $i_c,j_c$ is moved to the next pixel, so that Equation (5) is applied to each location in image $I_1*_a$ and its corresponding location in image $I_1*_b$:

$$G_{i_c,j_c} = \frac{Q^b_{i_c,j_c}}{Q^a_{i_c,j_c}}, \qquad (5)$$

$$1 \le i_c \le M, 1 \le j_c \le N$$

wherein the superscripts a and b denote respective image quality Q before and after the enhancement processing and $i_c$, $j_c$ denote the location. In other words, the enhancement gain is determined for each location $i_c$, $j_c$ in the image $I_1*_a$ that functioned as the center of the moving window when determining its image quality metric and the corresponding location of the image $I_1*_b$ that functioned as the center of the moving window when determining its image quality metric.

The fusion component 208 can further normalize the enhancement gain determined for each location $i_c$, $j_c$ in image $I_1*_a$ and its corresponding location in image $I_1*_b$ in accordance with Equation (6). For each iteration of Equation (6), the location $i_c$, $j_c$ is moved to the next pixel, so that Equation (6) is applied to each location in image $I_1*_a$ and its corresponding location in image $I_1*_b$:

$$W_{i_c,j_c} = \begin{cases} 0.1 + 0.4 * G_{i_c,j_c}/\max(G_{i_c,j_c}), & G_{i_c,j_c} < 1.0 \\ 0.5 + 0.5 * (G_{i_c,j_c} - 1)/\max(G_{i_c,j_c}), & G_{i_c,j_c} \ge 1.0 \end{cases} \qquad (6)$$

The normalization of the enhancement gain provided by application of Equation (6) provides scene content-dependent weighting per region that is proportional to each region's enhancement gain. A minimum weight of 0.1 is used in the normalized weighting function of Equation (6) to ensure application of a minimum amount of blending from the lower quality image. The coefficients in Equation (6) may be adjusted in practice to achieve more desirable results.

The fusion component 208 further generates a fused image for a given channel, for example, $I_{f1}$ for the first channel. The fused image $I_{f1}$ is of the same size as, and spatially registered with, the input image $I_1*_a$ and the enhanced image $I_1*_b$. The fused image $I_{f1}$ is generated by applying Equation (7) below (with channel index k=1), using the normalization of the enhancement gain determined for each of the corresponding spatial weighting functions. The fusion component 208 generates the fused image using the normalized enhancement gain of each location $i_c$, $j_c$ in image $I_1*_a$ and the corresponding location in image $I_1*_b$, wherein the image quality metric was determined for each of these locations on a regional scale, thus providing a spatially dynamic weighting function applied in accordance with Equation (7). For each iteration of Equation (7), the location $i_c$, $j_c$ is moved to the next pixel, so that Equation (7) is applied to each location in image $I_1*_a$ and its corresponding location in image $I_1*_b$:

$$I_{fk}(i,j) = I_a(i,j)(1-W_{i,j}) + I_b(i,j)W_{i,j}, \quad 1 \le i \le M, \ 1 \le j \le N;$$
$$k=1,2 \qquad (7)$$

wherein k is the channel index, and the subscript c in indices i and j is dropped to simplify notations, with the understanding that all relevant metrics are implicitly calculated for corresponding locations of the images $I_1*_a$ and $I_1*_b$ having the coordinates $i_c$, $j_c$, which is the location of the center of the moving window in each of the images $I_1*_b$ and $I_1*_b$ when the image quality metrics were determined.

In embodiments, only one channel is used, meaning only one image sensor (thermal by default) 102, e.g., the first or second image sensor 102, is provided to the fusion component 208, which applies Equations (1)-(7) to an image or streaming images captured by that image sensor 102. Regardless of whether both or one of the first and second image sensors 102 are provided, the single-channel fused images $I_{f1}$ and/or $I_{f2}$ can be provided to the display component 110. In embodiments, the channel fusion component 208 is omitted.

In embodiments, fusion component 208 processes both first and second channels associated with the respective first and second image sensors 102. The fusion component 208 outputs fused image $I_{f1}$ for each image $I_1$ (e.g., still or streaming images) generated by the first channel and outputs second fused image $I_{f2}$ for each image $I_2$ generated by the second channel. The second fused image $I_{f2}$ is the same size as and spatially registered with the second input image $I_2*_a$ and enhanced image $I_2*_b$. Since the input image $I_1*_a$ and the second input image $I_2*_a$ are spatially registered relative to one another, it follows that the fused image $I_{f1}$ and the second fused image $I_{f2}$ are spatially registered relative to one another. Accordingly, for a first image (input, enhanced, or fused) that is spatially registered with a second image (input, enhanced, or fused), each location of a plurality of locations in the first image has the same coordinates as a unique location in the plurality of locations in the second image.

Each single-channel fused image $I_{f1}$ or $I_{f2}$ includes important information of the original images $I_1*_a$ or $I_2*_a$ as well as many enhanced details of the enhanced images $I_1*_b$ or $I_2*_b$. In other words, each single-channel fused image $I_{f1}$ or $I_{f2}$ is spatially dynamic in two dimensions so that the strengths of each channel are emphasized and the weaknesses of each channel are de-emphasized on the regional-scale by the normalized enhancement gain. Although the gains determined in Equation (5) and the weights determined in Equation (6) are dynamically calculated on the regional scale, they carry scale information for each of the local, regional, and global scales, due to application of each of the local and global scales in the enhancement processing and the determination of image quality metrics at the regional scale.

In embodiments, as shown in FIGS. 1 and 2, single-channel fused images $I_{f1}$ and $I_{f2}$ are provided to the multi-channel fusion component 108, wherein $I_{f1}$ and $I_{f2}$ were synchronized when captured by each of the image sensor 102 and were spatially registered by S/R component and normalization 104. Streaming image pairs $I_{f1}$ and $I_{f2}$ can be processed by the multi-channel fusion component 108, as long as each image pair are synchronized and registered.

Figure 4:
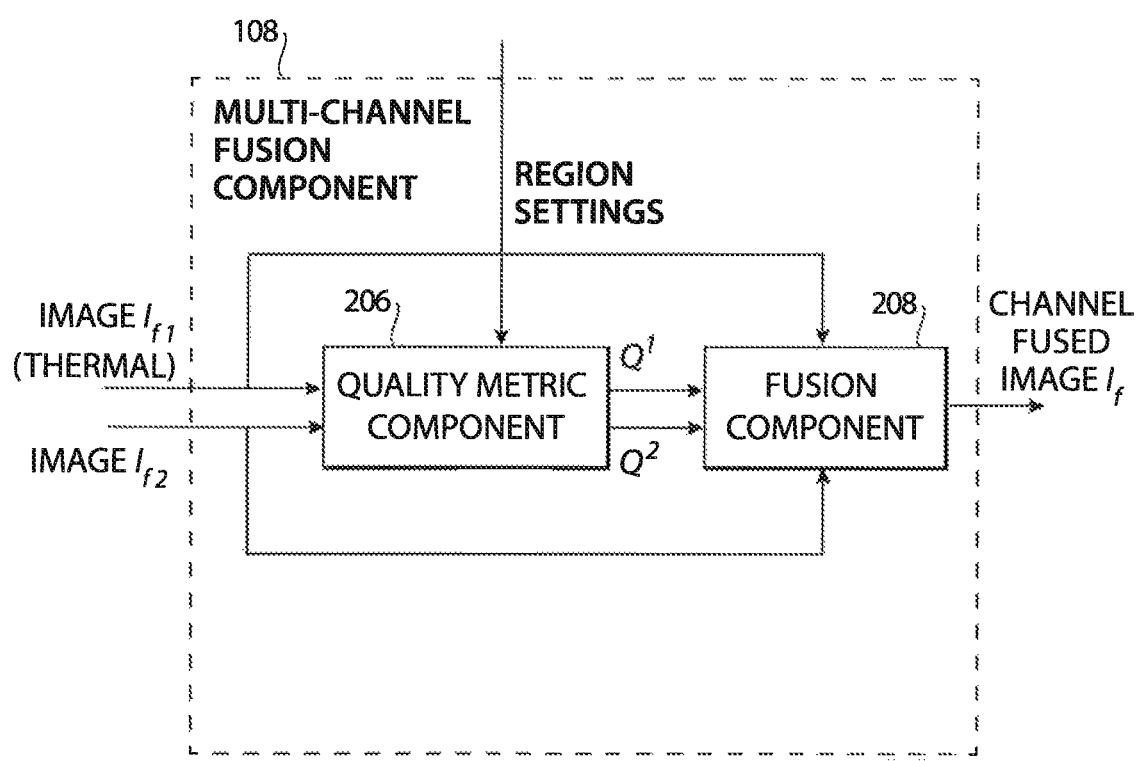
FIG. 4 is a block diagram of an exemplary embodiment of a multi-channel fusion component of the MC image processing system of FIG. 2.

With reference to FIG. 4, the multi-channel fusion component 108 receives images $I_{f1}$ (thermal by default) and $I_{f2}$ and outputs channel fused image $I_f$. Images $I_{f1}$ and $I_{f2}$ are synchronized and registered relative to one another.

Multi-channel fusion component 108 includes quality metric component 206 and fusion component 208, which apply Equations (1)-(7) to images $I_{f1}$ and $I_{f2}$ as described above with respect to FIG. 2.

The quality metric component 206 determines an image quality metric Q of each of images $I_{f1}$ and $I_{f2}$. More specifically, for each location of image $I_{f1}$, the location functions as the center of the moving window in image $I_{f1}$, and an image quality metric $Q^1$ is determined for that location using content of image $I_{f1}$ in a region covered by the moving window. For each location of image $I_{f2}$, the location functions as the center of the moving window in image $I_{f2}$, and an image quality metric $Q^2$ is determined for that location using content of image $I_{f2}$ in a region covered by the moving window. The image quality metric Q is determined for each of the images $I_{f1}$ and $I_{f2}$ at each of its locations as the moving window's center location (ic,jc) is moved, e.g., pixel by pixel, for each iteration of determining the image quality metric Q. The moving window includes m×n pixels centered at location (ic,jc), with m, n defined by region settings that can be input via a user interface of the image processing system 10 or received by another processing device.

The region settings applied by channel fusion component can be the same or different from the region settings applied by the single-channel image fusion component 106, although they are normally the same. The image quality metric Q can be determined using, for example, an effective signal-to-noise ratio (S/N), determined using Equations (2) and (3) (that is, by replacing subscripts a and b with subscripts 1 and 2, respectively) to determine the mean and standard deviation for a region centered at and covered by the moving window at the current position being processed. The image quality metric Q can be defined as the effective signal-to-noise ratio in accordance with Equation (4), which is computed for each position of the moving window.

The fusion component 208 receives the image quality metrics $Q^1$ and $Q^2$ and determines channel gain for each location in image In and its corresponding location in $I_{f2}$ in accordance with Equation (5), that is, by replacing superscripts a and b with superscripts 1 and 2 to indicate channels, respectively. Each location in image $I_{f2}$ corresponds to one of the locations of image $I_{f1}$. Since images $I_{f1}$ and $I_{f2}$ are spatially registered, each location in image $I_{f2}$ corresponds to a location in image $I_{f1}$ that has the same pixel coordinates.

The channel gain determined in Equation (5) can be normalized using Equation (6) to provide scene content-dependent normalized gain that is proportional to the channel gain. A minimum coefficient value of 0.1 can be used in the normalized weighting function of Equation (6) to ensure application of a minimum amount of blending from the enhanced image denoted by subscript "b" and the pre-enhanced image denoted by subscript "a". The coefficients in Equation (6) may be adjusted in practice to achieve more desirable results.

The fusion component 208 can further apply Equation (7) to fuse images $I_{f1}$ and $I_{f2}$ into channel fused image $I_f$, that is, by substituting subscripts "a" and "b" with subscripts "1" and "2," and substituting "$I_{f1}$" with channel fused image "$I_f$." The fused image $I_f$ is generated by applying Equation (7) to each location of image $I_{f1}$ and the corresponding location in image $I_{f2}$ using the enhancement gain determined for the corresponding locations as a weighting function for the content of the corresponding regions. By applying the normalized channel gain to each location in image $I_{f1}$ and its corresponding location in image $I_{f2}$, wherein the image quality metric was determined for each of these locations on a regional scale, the channel fused image $I_f$ is spatially dynamic in two dimensions so that the strengths of each channel are emphasized (i.e., weighted more heavily) and the weaknesses of each channel are de-emphasized (or weighted less) per region by the normalized channel gain.

FIG. 5 shows a flow diagram 500 that illustrates an example method in accordance with an embodiment. The method can be performed by a fusion image processing system, such as image processing system 10 shown in FIG. 1. At operation 502, an input image output by a thermal imaging sensor is received. At operation 504, an image quality metric is determined for each location of a reference point of a moving window, wherein the image quality metric is a function of evaluation of image content included in a region covered by the moving window. The moving window is moved through the input image, its reference point moving pixel by pixel, so that operation 504 is performed for each pixel.

At operation 506 an enhancement process, such as LACE, is applied to the input image that generates a resulting enhanced image. At operation 508, an enhanced image quality metric is determined for each location of the reference point of the moving window, wherein the enhanced image quality metric is a function of evaluation of image content included in the region covered by the moving window. Each pixel of the enhanced image has a turn to be the reference point, e.g., center, of the moving window. At operation 510, for each location in the input image and its corresponding location in the enhanced image, a normalized enhancement gain is determined. The normalized enhancement gain for the corresponding locations is a function of the image quality metric and the enhanced image quality metric that were determined for each of the respective locations.

At operation 512, for each location of the input image and its corresponding location in the enhanced image, first image content associated with the location in the input image is fused with second image content associated with the corresponding location in the enhanced image. The fusing is a function of the first image content and the second image content as weighted by the normalized enhancement gain determined for the corresponding locations. Operation 501 includes operations 502, 504, 506, 508, 510, and 512. In embodiments, the fused image can be output for display.

FIG. 6 shows a flow diagram 600 that illustrates an example method performed by a fusion image processing system, such as image processing system 10 shown in FIG. 1. The method illustrated by flow diagram 500 in FIG. 5 continues at operation 501, which is repeated as applied to a second input image output by a second imaging sensor. The second input image is received, wherein the second input image is synchronized and spatially registered with the input image, wherein the first and second imaging sensors have disparate imaging sensitivities and/or responsivities for capturing images and/or output images, or different qualities relative to one another.

Accordingly, at operation 501, a second input image output by a second imaging sensor is received, wherein the second input image is synchronized and spatially registered with the input image, wherein the first and second imaging sensors have disparate imaging sensitivities and/or responsivities for capturing images and/or output images of different qualities relative to one another. Each location of the second input image functions, in turn, as the reference of the moving window for determining a second input quality metric as a function of evaluation of image content in the second input image included in the region covered by the moving window.

The enhancement process is applied to the second input image and a resulting second enhanced image is generated that is spatially registered with the second input image. Each location of the second enhanced input image functions, in turn, as the reference of the moving window for determining a second enhanced input quality metric as a function of evaluation of image content in the second enhanced input image included in the region covered by the moving window. For each location in the second input image and its corresponding location in the second enhanced input image, a second normalized enhancement gain is determined.

For each location in the second input image and its corresponding location in the second enhanced input image, image content included in the region covered by the moving window when centered at the location in the second input image is fused with image content included in the region covered by the moving window when centered at the location in the second enhanced image. The fusion is weighted by the second normalized enhancement gain determined for the corresponding locations. A second fused image is generated that includes fused content determined for each of the locations in the second input image and its corresponding location in the second enhanced image.

At operation 602, for each location in the first fused image of the reference of the moving window, a third input quality metric is determined as a function of evaluation of first fused image content in the first fused image for the region covered by the moving window. At operation 604, for each location in the second fused image of the reference of the moving window, a fourth input quality metric is determined as a function of evaluation of second fused image content in the second fused image for the region covered by the moving window. At operation 606, for each location in the first fused image and its corresponding location in the second fused image, a normalized channel gain is determined. The normalized channel gain is a function of the first fused quality metric and the second fused quality metric associated with the corresponding locations.

At operation 608, for each location in the first fused image and its corresponding location in the second fused image, the first fused image content associated with the location in the first fused image is fused with the second fused image content associated with the corresponding location in the second fused image. This fusing is a function of the first fused image content and the second fused image content, as weighted by the normalized channel gain determined for the corresponding locations.

The display component 16 receives a selection from the selection menu 112 of FIG. 2, wherein the selection menu 112 includes, for example, the color map set generated at operation 26 of FIG. 1B, the layer 40 generated at operation 28 of FIG. 1B, the fused image generated at operation 512 of FIG. 5 the second fused image generated at operation 501 of FIGS. 5 and 6, and the third fused image generated at operation 608 of FIG. 6.

The displayed output accurately displays the warm target and its thermal outline by using a set of color maps, each color map having, in embodiments, at least one independent control, and in embodiments, multiple independent controls, e.g., of steepness, center, and scale. One of the color maps can be selected to be used for the warm target, wherein the warm target is mapped to the highest pixel values of the selected color map.

A filtering process is applied that uses content of the input image to form a thermal outline of the warm target. In this way, the warm target and its thermal outline are displayed along with other image outputs without being negatively affected by content of or colors used by other images being displayed, such that the effectiveness of warm target depiction is maintained, allowing for fast and accurate locating and tracking of the warm target.

The enhanced detection and multiple image product display options can help improve operational response time and performance, in particular in real time operations. The options of displaying the warm target and thermal outlines along with other image products, such as original images, enhanced images, and fused image products, using image quality and scene content as dependent metrics, can help enhance situational awareness of overall operational environment, in addition to effective warm target detection and display. During real time operations the input images can be processed dynamically, and the image product displayed can be updated accordingly.

Aspects of the present disclosure are described above with reference to flow diagram illustrations and/or block diagrams of methods, apparatus (systems) and computer program products according to embodiments of the disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

Embodiments of the image processing system 10 may be implemented or executed by one or more computer systems. For example, WTDO component 14, single-channel image fusion component 106, and multi-channel fusion component 108, or multiple instances thereof, can be implemented using one or more computer systems such as example computer system 700 illustrated in FIG. 7. Each computer system 700 can implement one or more of single-channel image fusion component 106 and multi-channel fusion component 108, or multiple instances thereof. In various embodiments, computer system 700 may include a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 700 is only one example of a suitable system and is not intended to suggest any limitation as to the scope of use or functionality of embodiments of the disclosure described herein. Regardless, computer system 700 is capable of being implemented and/or performing any of the functionality set forth hereinabove.

Computer system 700 may be described in the general context of computer system-executable instructions, such as program modules, being executed by a computer system. Generally, program modules may include routines, programs, objects, components, logic, data structures, and so on that perform particular tasks or implement particular abstract data types. Computer system 700 may be practiced in distributed data processing environments where tasks are performed by remote processing devices that are linked through a communications network. In a distributed data processing environment, program modules may be located in both local and remote computer system storage media including memory storage devices.

Figure 7:
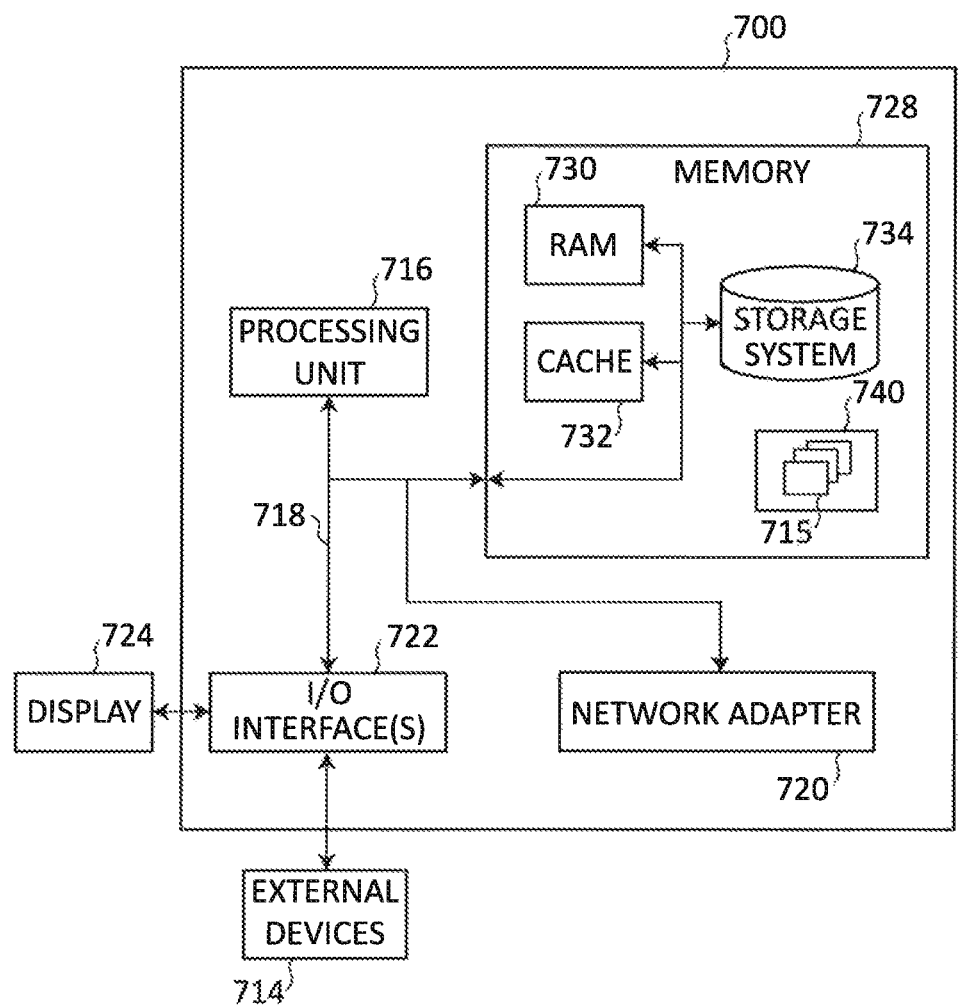
FIG. 7 is a block diagram of an exemplary computer system configured to implement components of the image processing system in accordance with embodiments of the disclosure.

Computer system 700 is shown in FIG. 7 in the form of a general-purpose computing device. The components of computer system 700 may include, but are not limited to, one or more processors or processing units 716, a system memory 728, and a bus 718 that couples various system components including system memory 728 to processor 716. Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 700 typically includes a variety of computer system readable media. Such media may be any available media that is accessible by the image processing system 10, and it includes both volatile and non-volatile media, removable and non-removable media.

System memory 728 can include computer system readable media in the form of volatile memory, such as random access memory (RAM) 730 and/or cache memory 732. Computer system 700 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the disclosure.

Program/utility 740, having a set (at least one) of program modules 715, such as for performing the operations of flow diagrams 20, 500, and 600 shown in FIGS. 1B, 5, and 6, respectively, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 715 generally carry out the functions and/or methodologies of embodiments of the disclosure as described herein.

Computer system 700 may also communicate with one or more external devices 714 such as a keyboard, a pointing device, a display 724, etc.; one or more devices that enable a user to interact with computer system 700; and/or any devices (e.g., network card, modem, etc.) that enable the image processing system 10 to communicate with one or more other computing devices. Such communication can occur via Input/Output (I/O) interfaces 722. Still yet, computer system 700 can communicate with one or more networks such as a local area network (LAN), a general wide area network (WAN), and/or a public network (e.g., the Internet) via network adapter 720. As depicted, network adapter 720 communicates with the other components of the image processing system 10 via bus 718. It should be understood that although not shown, other hardware and/or software components could be used in conjunction with computer system 700. Examples, include, but are not limited to: microcode, device drivers, redundant processing units, external disk drive arrays, RAID systems, tape drives, and data archival storage systems, etc.

The flow diagram and block diagrams in the Figures illustrate the architecture, functionality, and operation of possible implementations of systems, methods and computer program products according to various embodiments of the present disclosure. In this regard, each block in the flow diagram or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method include the ability to detect a warm target in an accurate manner that includes a determination of the boundaries of the warm target, and clearly depicting the boundaries of the warm target as an outline in a layer that can be displayed independently or in combination with an image or a fused image.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. An image processing system comprising:
a memory configured to store instructions;
a processor disposed in communication with the memory, wherein the processor, upon execution of the instructions is configured to:
receive an input image output by an imaging sensor, the image sensor being sensitive to thermal emissions;
normalize the input image;
apply a smoothing operation to the normalized image;
apply a peak-peak filter to the smoothed, normalized image by sliding a moving window through the entire smoothed, normalized image and applying the peak-peak filter to content of the smoothed, normalized image at each location of the moving window to detect a warm target and generate a coarse, thermal outline formed of gray-level pixels of the warm target based on the content of the smoothed, normalized image;
apply a threshold function to the coarse, thermal outline, the threshold function outputting a bounded outline;
refine the bounded outline by applying at least one of a morphological thinning function and a morphological closing function;
construct a color map for each of at least two color channels of a color scheme system, each color map being continuous and monotonic, the color map being constructed to highlight the warm target as outlined by the refined, bounded outline while deemphasizing other contents of the smoothed, normalized image; and
display separately or in any combination in registration with one another, per user selection, the input image without the color map, the warm target and thermal outline without the color map, and the warm target and thermal outline with the color map.

2. The image processing system of claim 1, wherein the processor, upon execution of the Instructions, is further configured to convert each pixel of the image to eight bits for color representation and processing.

3. The image processing system of claim 1, wherein constructing each of the color maps includes constructing a continuous and monotonic mapping function for the corresponding color channel, with each mapping function having at least one independent control.

4. The image processing system of claim 3, wherein the at least one independent control includes multiple independent controls.

5. The image processing system of claim 3, wherein the mapping function is a sigmoid function and has independent control of its steepness, center, and scale.

6. The image processing system of claim 5, wherein the sigmoid functions of each of the respective color channels are staggered relative to one another.

7. The image processing system of claim 5, wherein two of the sigmoid functions are identical to each other.

8. The image processing system of claim 3, wherein the processor, upon execution of the Instructions, is further configured to: determine a quality metric for the input image as a function of quality of image content of the input image by sliding a second moving window through a plurality of locations of the input image, wherein the second moving window is sized to include at least a significant portion of a target of interest; apply an enhancement process to the input image and generate a resulting enhanced image that is spatially registered with the input image; determine a quality metric for the enhanced image as a function of quality of image content of the enhanced image by sliding the second moving window through the plurality of locations of the entire enhanced image; determine single-channel fused content of the input image at each location of the plurality of locations as a function of the content of the input image, the quality metric for the input image, the content of the enhanced image, and the quality metric for the enhanced image determined for the location; and generate a single-channel fused image for the input image that includes the single-channel fused content of the input image determined for each location of the plurality of locations.

9. The image processing system of claim 8, wherein, determining the quality metric for the input image includes determining an effective signal-to-noise ratio for a region of the input image covered by the second moving window at each location of the plurality of locations; and determining the quality metric for the enhanced image includes determining an effective signal-to-noise ratio for the region of the enhanced image covered by the second moving window at each location of the plurality of locations, wherein the processor, upon execution of the instructions, is further configured to determine an enhancement gain for each location of the plurality of locations as a function of a ratio of the quality metric for the input image relative to the quality metric for the enhanced image determined for the location, and wherein determining the single-channel fused content of the input image at each location of the plurality of locations is a function of the enhancement gain determined for the location.

10. The image processing system of claim 8, wherein the processor, upon execution of the instructions, is further configured to display an image product that is a selectable combination of the input image, the enhanced image, and the single-channel fused image.

11. The image processing system of claim 8, wherein the processor, upon execution of the instructions, is further configured to; receive a second input image output by a second imaging sensor, the second input image being synchronized and spatially registered with the input image provided by the first imaging sensor, wherein the first imaging sensor and the second imaging sensor have disparate imaging sensitivities and/or responsivities for capturing images relative to one another or output images having different qualities relative to one another; determine a quality metric for the second input image as a function of quality of image content of the second input image by sliding the second moving window through the plurality of locations of the second input image; apply the enhancement process to the second input image and generate a resulting second enhanced image that is spatially registered with the second input image; determine a quality metric for the second enhanced image as a function of quality of image content of the second enhanced image by sliding the second moving window through the plurality of locations of the second enhanced image; determine single-channel fused content of the second input image at each location of the plurality of locations as a function of the content of the second input image, the quality metric for the second input image, the content of the second enhanced image, and the quality metric for the second enhanced image determined for the location; and generate a single-channel fused image for the second input image that includes the single-channel fused content of the second input image determined for each location of the plurality of locations.

12. The image processing system of claim 11, wherein the imaging sensor is configured to sense images using a first spectral wavelength range and the second imaging sensor is configured to sense images using a second spectral wavelength range that is different than the first spectral wavelength range, wherein at least one of the first and second spectral wavelength ranges is in the thermal infrared range.

13. The image processing system of claim 11, wherein the processor, upon execution of the instructions, is further configured to: determine a quality metric for the single-channel fused image for the input image as a function of quality of image content of the single-channel fused image for the input image by sliding a second moving window through the plurality of locations of the single-channel fused image for the input image; determine a quality metric for the single-channel fused image for the second input image as a function of quality of image content of the single-channel fused image for the second input image by sliding a second moving window through the plurality of locations of the single-channel fused image for the second input image; determine multi-channel fused content at each location of the plurality of locations as a function of the content of the input image, the content of the second input image, the quality metric for the input image, the quality metric for the second input image, the content of the enhanced image, the content of the second enhanced image, the quality metric for the enhanced image, and the quality metric for the second enhanced image determined for the location; and generate a multi-channel fused image that includes the multi-channel fused content determined for each location of the plurality of locations, wherein: the processor, upon execution of the instructions is further configured to display a displayable image product that is a selectable combination of the input image, the second input image, the enhanced image, the second enhanced image, the single-channel fused image of the input image, the single-channel fused image of the second input image, and the multi-channel fused image.

14. The image processing system of claim 1, wherein the outline is formed of pixels having more than two levels.

15. A method of detecting and displaying a warm target with a thermal outline, the method comprising:
  receiving an input image output by an imaging sensor, the image sensor being sensitive to thermal emissions;
  normalizing the input image;
  applying a smoothing operation to the normalized image;
  applying a peak-peak filter to the smoothed, normalized image by sliding a moving window through the entire smoothed, normalized image and applying the peak-peak filter to content of the smoothed, normalized image at each location of the moving window to detect a warm target and generate a coarse thermal outline formed of gray-level pixels of the warm target based on the content of the smoothed, normalized image;
  applying a threshold function to the coarse thermal outline to output a bounded outline;
  refining the bounded outline by applying at least one of a morphological thinning function and a morphological closing function;
  constructing a color map for each of at least two color channels of a color scheme system, each color map being continuous and monotonic, the color map being constructed to highlight the warm target as outlined by the refined, bounded outline while deemphasizing other contents of the smoothed, normalized image; and
  displaying separately or in any combination in registration with one another, per user selection, the input image without the color map, the warm target and thermal outline without the color map, and the warm target and thermal outline with the color map.

16. The method of claim 15, further comprising:
  receiving a second input image from a second sensor;
  wherein displaying further includes displaying the second image in any combination and in registration with, per user selection, the warm target and thermal outline without the color map, the warm target and thermal outline with the color map.

17. The method of claim 16, wherein the second sensor is a short wave infrared sensor.

* * * * *